(12) United States Patent
Su et al.

(10) Patent No.: US 8,960,924 B2
(45) Date of Patent: Feb. 24, 2015

(54) ILLUMINATION SYSTEM AND PROJECTION APPARATUS

(75) Inventors: Chen-Kang Su, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 191 days.

(21) Appl. No.: 13/615,690

(22) Filed: Sep. 14, 2012

(65) Prior Publication Data
US 2013/0088692 A1 Apr. 11, 2013

(30) Foreign Application Priority Data
Oct. 6, 2011 (TW) .............................. 100136274 A

(51) Int. Cl.
*G03B 21/14* (2006.01)
*H04N 9/31* (2006.01)

(52) U.S. Cl.
CPC .................................. *H04N 9/3114* (2013.01)
USPC ................... 353/84; 353/31; 353/85; 353/94; 353/98

(58) Field of Classification Search
USPC ............ 353/31, 84, 85, 94, 98, 121; 359/237, 359/267, 439, 440, 867, 869; 362/260, 231, 362/293, 84; 349/5, 7–9
See application file for complete search history.

(56) References Cited

U.S. PATENT DOCUMENTS

| | | | | |
|---|---|---|---|---|
| 8,328,363 | B2 * | 12/2012 | Lin et al. ........................ | 353/31 |
| 8,403,492 | B2 * | 3/2013 | Shibasaki ...................... | 353/31 |
| 2007/0120077 | A1 * | 5/2007 | Berman et al. ............ | 250/504 R |
| 2011/0242791 | A1 * | 10/2011 | Chen et al. ...................... | 362/84 |
| 2011/0261326 | A1 * | 10/2011 | Wang et al. ..................... | 353/31 |
| 2011/0292349 | A1 * | 12/2011 | Kitano et al. .................... | 353/31 |
| 2012/0081672 | A1 * | 4/2012 | Okuda et al. .................... | 353/20 |
| 2013/0070205 | A1 * | 3/2013 | Pan et al. ......................... | 353/31 |
| 2013/0222772 | A1 * | 8/2013 | Matsubara ....................... | 353/31 |
| 2014/0043589 | A1 * | 2/2014 | Chifu et al. ...................... | 353/33 |

FOREIGN PATENT DOCUMENTS

| | | |
|---|---|---|
| CN | 1619355 | 5/2005 |
| CN | 1632693 | 6/2005 |
| CN | 1755458 | 4/2006 |
| CN | 1977543 | 6/2007 |
| CN | 101675668 | 3/2010 |
| CN | 101918877 | 12/2010 |
| EP | 1730596 | 12/2006 |
| TW | M394467 | 12/2010 |
| TW | M398614 | 2/2011 |

(Continued)

*Primary Examiner* — Sultan Chowdhury
(74) *Attorney, Agent, or Firm* — Jianq Chyun IP Office

(57) ABSTRACT

An illumination system including a light source, a filtering module, a wavelength conversion unit, and a reflection unit is provided. The light source emits an illumination beam. The filtering module is disposed on a transmission path of the illumination beam and includes a plurality of filtering units having different colors. The filtering units move into the transmission path of the illumination beam in turn. Each filtering unit reflects a part of the illumination beam and allows another part of the illumination beam to pass through. The wavelength conversion unit is disposed on a transmission path of the part of the illumination beam reflected by at least one of the filtering units to convert the part of the illumination beam reflected by the at least one of the filtering units into a converted beam. The wavelength conversion unit is disposed on the reflection unit. A projection apparatus is also provided.

18 Claims, 5 Drawing Sheets

(56) References Cited

FOREIGN PATENT DOCUMENTS

| TW | M398686 | 2/2011 |
| TW | 201126254 | 8/2011 |
| WO | 2005084213 | 9/2005 |

\* cited by examiner

ILLUMINATION SYSTEM AND PROJECTION APPARATUS

CROSS-REFERENCE TO RELATED APPLICATION

This application claims the priority benefit of Taiwan application serial no. 100136274, filed on Oct. 6, 2011. The entirety of the above-mentioned patent application is hereby incorporated by reference herein and made a part of this specification.

BACKGROUND OF THE INVENTION

1. Field of the Invention

The invention relates to an illumination system and a projection apparatus.

2. Description of Related Art

With the advancement in display technology, various display apparatuses such as liquid crystal displays (LCDs), plasma displays, organic light emitting diode (OLED) displays, cathode ray tubes (CRTs), and projection apparatuses are now available for selection. Being capable of generating larger frames with more compact volume, projection apparatuses are irreplaceable in several usages, for example, conference briefing, home theater, classroom briefing when teaching or researching, and so on.

Currently, light valves applied in projection apparatuses are generally categorized into two categories; that is, digital micro-mirror device and liquid-crystal-on-silicon panel (LCOS) panel. Projection apparatuses adopting digital micro-mirror device display full color images using a color sequential method. In this type of projection apparatus, an illumination beam emitted by a white light bulb (e.g. a high pressure mercury lamp) passes through an ultraviolet and infrared filter to form the visible light (with a wavelength ranging from about 380 nm to 780 nm) and then filter different colors through a color wheel. Next, the illumination beam is converged on the digital micro-mirror device through a lens after the uniformization of a light integration rod. By switching on and off the digital micro-mirror device, the colors conforming to the image are reflected to a screen for imaging. Here, a light emitting efficiency of the entire optical system is about 25%. For example, a 180 W bulb is capable of emitting 8600 lm, but only 2150 lm is remained when the bulb is placed in the projection system. One of the devices having the lowest light efficiency is the color wheel. This is due to the fact that the color wheel adopts a sequential display and reflects the light of unneeded colors. For instance, when a red filter of the color wheel is moved into a light path, the red light passes through the red filter, but the green light and the blue light are reflected back to the high pressure mercury lamp as a heat source, thereby resulting in the loss in light energy.

SUMMARY OF THE INVENTION

The invention is directed to an illumination system having high light efficiency.

The invention is directed to a projection apparatus having high light efficiency.

One embodiment of the invention is directed to an illumination system including a light source, a filtering module, a wavelength conversion unit, and a reflection unit. The light source is configured to emit an illumination beam. The filtering module is disposed on a transmission path of the illumination beam. The filtering module includes a plurality of filtering units in different colors. The filtering units move into the transmission path of the illumination path in turn. Each of the filtering units reflects a part of the illumination beam and allows another part of the illumination beam to pass through. The wavelength conversion unit is disposed on a transmission path of the part of the illumination beam reflected by at least one of the filtering units to convert the part of the illumination beam reflected by the at least one of the filtering units into a converted beam. The wavelength conversion unit is disposed on the reflection unit. The reflection unit reflects the converted beam to the at least one of the filtering units, and at least a part of the converted beam passes through the at least one of the filtering units.

Another embodiment of the invention is directed to a projection apparatus including the illumination system aforementioned, a light valve, and a projection lens. The light valve is disposed on a transmission path of the another part of the illumination beam passing through the at least one of the filtering units and at least a part of the converted beam to convert the another part of the illumination beam passing through the at least one of the filtering units and the at least a part of the converted beam into an image beam. The projection lens is disposed on a transmission path of the image beam.

Since the illumination system and the projection apparatus in the embodiments of the invention adopt the wavelength conversion unit to convert the light reflected by the filtering units and adopt the reflection unit to reflect the converted beam converted by the filtering units back to the filtering units, the illumination system and the projection apparatus in the embodiments of the invention are capable of recycling and re-utilizing the light that failed to pass through the filtering module. Consequently, the illumination system and the projection apparatus have high light efficiency.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENTS

Figure 1A:
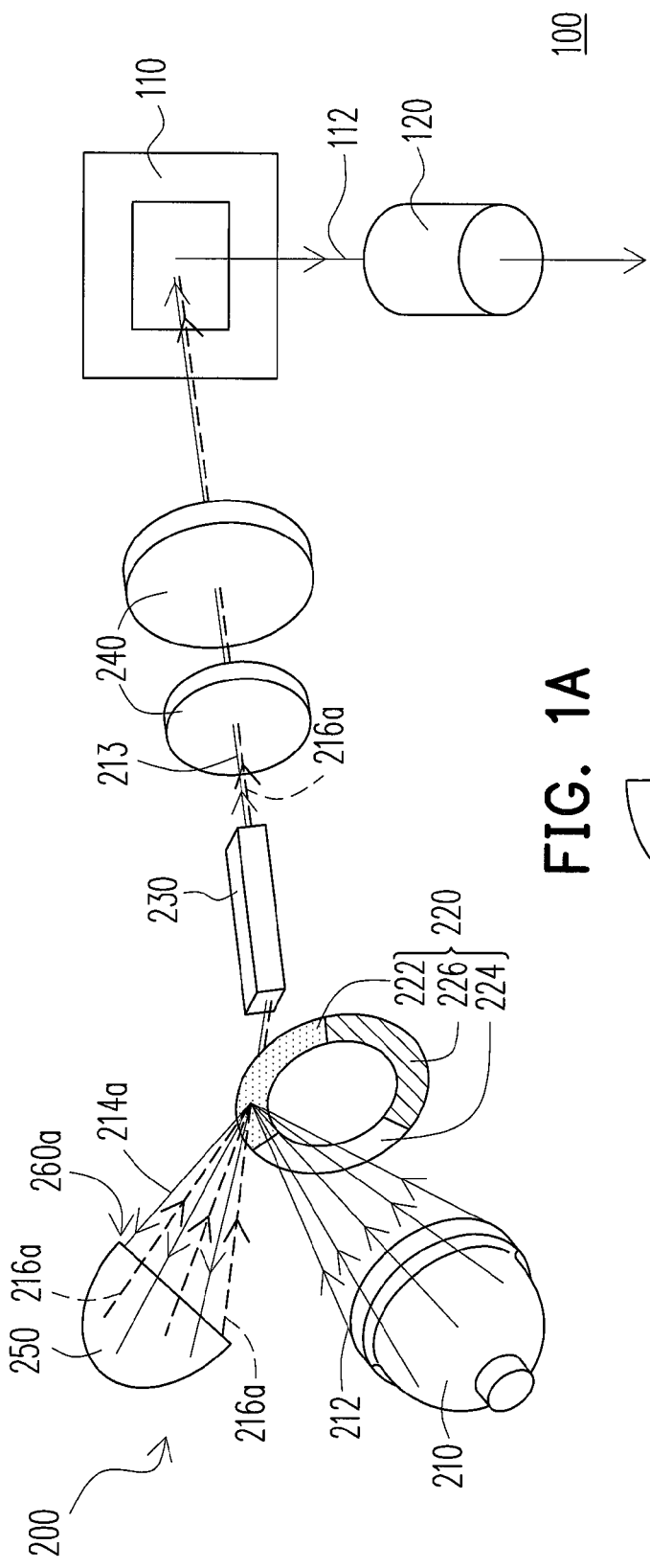
FIG. 1A is a schematic diagram illustrating a projection apparatus according to an embodiment of the invention.

FIG. 1A is a schematic diagram illustrating a projection apparatus according to an embodiment of the invention. FIG.

Figure 1B:
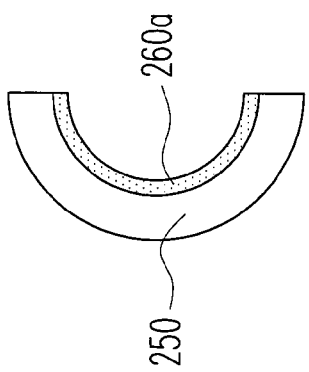
FIG. 1B shows a schematic cross-sectional diagram of a wavelength conversion unit and a reflection unit in FIG. 1A.
Figure 2:
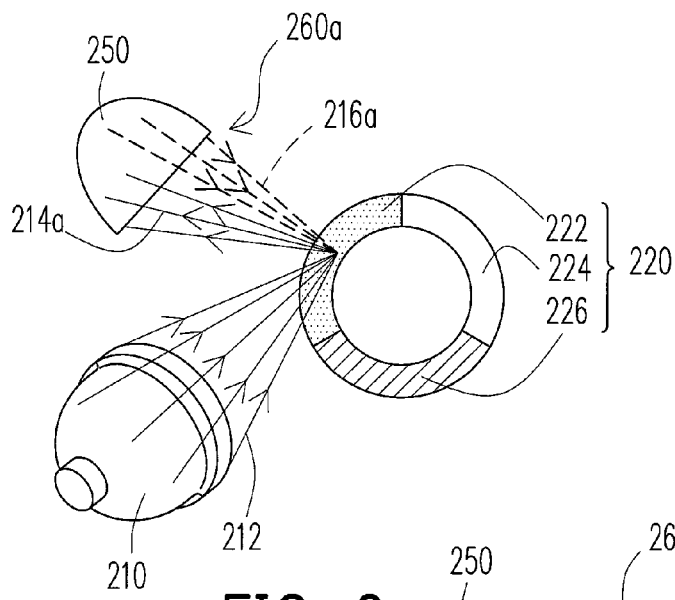
FIG. 2 is a schematic partial diagram illustrating an illumination system in FIG. 1A.

1B shows a schematic cross-sectional diagram of a wavelength conversion unit and a reflection unit in FIG. 1A. FIG. 2 is a schematic partial diagram illustrating an illumination system in FIG. 1A. Referring to FIGS. 1A, 1B, and 2, a projection apparatus 100 of the present embodiment includes an illumination system 200, a light valve 110, and a projection lens 120. The projection system 200 includes a light source 210, a filtering module 220, a wavelength conversion unit 260a, and a reflection unit 250. The light source 210 is configured to emit an illumination beam 212. In the present embodiment, the light source 210 is a high pressure mercury lamp and the illumination beam 212 is a white beam. Specifically, the illumination beam 212 includes a beam in a first color, a beam in a second color, a beam in a third color, and a beam in a fourth color having the wavelengths from the longest to the shortest. Here, the beam in the first color, the beam in the second color, the beam in the third color, and the beam in the fourth color are a red beam, a green beam, a blue beam, and an ultraviolet beam respectively; however, the invention is not limited thereto. Nevertheless, in other embodiments, the light source 210 can also be a light emitting diode (LED) or other suitable light emitting devices.

The filtering module 220 is disposed on a transmission path of the illumination beam 212. The filtering module 220 includes a plurality of filtering units in different colors (e.g. filtering units 222, 224, and 226). The filtering units 222, 224, and 226 move into the transmission path of the illumination beam 212 in turn. In the present embodiment, the filtering module 220 is, for example, a color wheel. The filtering units 222, 224, 226 are a plurality of filters on the color wheel, for example. In the present embodiment, colors of the filtering units include the first color, the second color, and the third color. For instance, in the present embodiment, the filtering units 222, 224, and 226 are respectively a filtering unit in the first color, a filtering unit in the second color, and a filtering unit in the third color. That is, the filtering units 222, 224, and 226 are respectively a red filtering unit, a green filtering unit, and a blue filtering unit; however, the invention is not limited thereto. In other embodiments, the first color, the second color, the third color can also be three other colors.

Each of the filtering units 222, 224, 226 reflects a part of the illumination beam 212 and allows another part of the illumination beam 212 to pass through. For example, when the filtering unit 222 in the first color moves into the transmission path of the illumination beam 212, the filtering unit 222 reflects a part of the illumination beam 214a and allows another part of the illumination beam 213 to pass through. At this time, a color of the another part of the illumination beam 213 changes to the first color (that is, red).

The wavelength conversion unit 260a is disposed on a transmission path of the part of the illumination beam 212 reflected by at least one of the filtering units (e.g. the filtering unit 222) to convert the part of the illumination beam 214a reflected by the at least one of the filtering units 222 into a converted beam 216a. Herein, a wavelength of the converted beam 216a is longer than a wavelength of the part of the illumination beam 214a reflected by the at least one of the filtering units 222. In details, the filtering unit 222 is suitable for reflecting a light that is not in the first color (i.e. red) and a color of the part of the illumination beam 214a reflected therefrom includes the second color (green), the third color (blue), and the fourth color (ultraviolet). Moreover, in the present embodiment, the wavelength conversion unit 260a is a fluorescent layer. The fluorescent layer includes a phosphor in a single color, for instance, a phosphor in the first color (red phosphor). Thus, when a green light, a blue light, and an ultraviolet light are irradiated on the wavelength conversion unit 260a, the converted beam 216a in the first color (red) is excited.

The wavelength conversion unit 260a is disposed on the reflection unit 250. The reflection unit 250 reflects the converted beam 216a to the at least one of the filtering units 222, and at least a part of the converted beam 216a passes through the at least one of the filtering units 222. In the present embodiment, since the converted beam 216a is in red, the converted beam 216a is capable of passing through the filtering unit 222 in red. In addition, the reflection unit 250 is a concave mirror in the present embodiment to converge the converted beam 216a on the at least one of the filtering units 222.

The light valve 110 is disposed on a transmission path of the another part of the illumination beam 213 passing through the at least one of the filtering units 222 and the at least a part of the converted beam 216a to convert the another part of the illumination beam 213 passing through the at least one of the filtering units 222 and the at least a part of the converted beam 216a into an image beam 112. Moreover, the filtering units 224 and 226 allow the another part of the illumination beam 213 to pass through, so that a color of the another part of the illumination beam 213 changes to the second color (green) and the third color (blue) respectively after passing through the filtering units 224 and 226. Accordingly, the light valve 110 can convert the red beam, the green beam and the blue beam into the image beam 112 in full color. In the present embodiment, the light valve 110 is, for example, a digital micro-mirror device (DMD). However, in other embodiments, the light valve 110 can also be a liquid-crystal-on-silicon panel, a transmissive liquid crystal panel or other suitable spatial light modulator (SLM).

The projection lens 120 is disposed on a transmission path of the image beam 112 to project the image beam 112 onto a screen. An image frame can thus be imaged on the screen accordingly.

In the present embodiment, an optical axis of the light source 210 tilts relative to the filtering units 222, 224, 226 and an optical axis of the reflection unit 250 tilts relative to the filtering units 222, 224, 226. Consequently, the part of the illumination beam 214a reflected by the filtering unit 222 can be transmitted to the wavelength conversion unit 260a and not reflected back to the light source 210. In one embodiment, a tilting direction of the optical axis of the light source 210 is opposite from a tilting direction of the optical axis of the reflection unit 250 to increase a ratio of the part of the illumination beam 214a transmitted to the wavelength conversion unit 260a.

Since the illumination system 200 and the projection apparatus 100 in the present embodiment adopt the wavelength conversion unit 260a to convert the light reflected by the filtering unit 222 and adopt the reflection unit 250 to reflect the converted beam 216a converted by the filtering unit 222 back to the filtering unit 222, the illumination system 200 and the projection apparatus 100 in the present embodiment are capable of recycling and re-utilizing the light that failed to pass through the filtering module 220. As a result, the illumination system 200 and the projection apparatus 100 have high light efficiency. Further, in the present embodiment, since the converted beam 216a is in red and capable of passing through the filtering unit 222 in red, the present embodiment can enhance the intensity of the red part of the light provided by the illumination system 200. Since the high pressure mercury lamp has a lower intensity in the red part in its emission spectrum, the present embodiment can improve a color render index of the image frame of the projection apparatus 100 by enhancing the intensity of the red part.

In the present embodiment, the projection apparatus 100 further includes a light uniformization device 230 and at least one lens 240 (a plurality of lenses 240 is shown in FIG. 1A as an example). The light uniformization device 230 uniformizes the another part of the illumination beam 213 and the converted beam 216a from the filtering module 220. The lenses 240 converge the another part of the illumination beam 213 and the converted beam 216a from the light uniformization device 230 on the light valve 110. In the present embodiment, the light uniformization device 230 is, for example, a light integration rod. Nonetheless, the light uniformization device 230 can also be a lens array or other suitable light uniformization devices in other embodiments.

Figure 3:
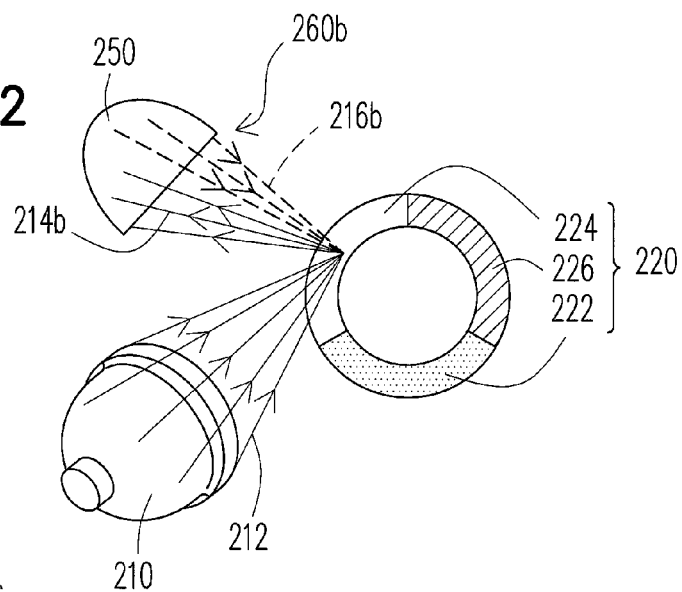
FIG. 3 and FIG. 4 depict two other variations of the illumination system in FIG. 1A.
Figure 4:
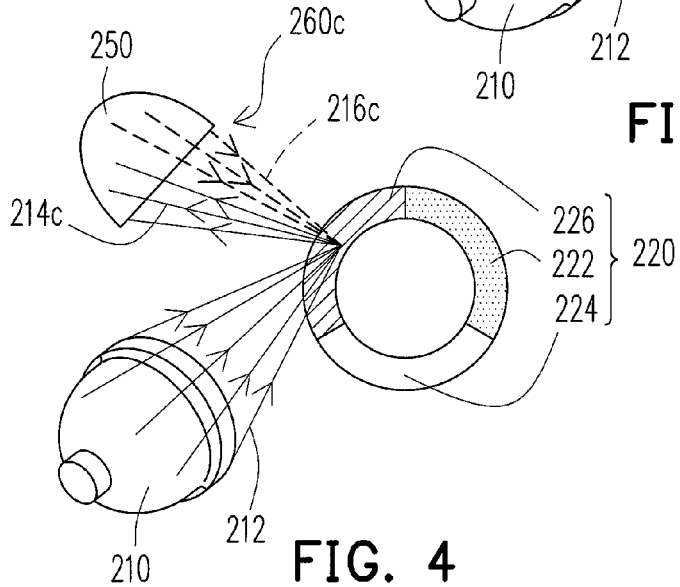

In other embodiments, the wavelength conversion unit 260a can also be replaced by a wavelength conversion unit 260b having the phosphor in the second color (green) (as shown in FIG. 3) or a wavelength conversion unit 260c having the phosphor in the third color (blue) (as depicted in FIG. 4). In the embodiment in FIG. 3, the part of the illumination beam 214b reflected by the filtering unit 224 includes a blue beam and an ultraviolet beam. Therefore, when the part of the illumination beam 214b irradiates to the wavelength conversion unit 260b, the converted beam 216b in the second color (green) can be excited. The green converted beam 216b then passes through the green filtering unit 224 to reach the light valve 110 (as shown in FIG. 1A). Accordingly, the embodiment in FIG. 3 can enhance the intensity of the green part in the light provided by the illumination system 200. Since human eyes sense brightness mainly from the intensity of green light, the brightness of the illumination system can be increased by enhancing the intensity of the green part in the light provided by the illumination system, thereby increasing the brightness of the image frame provided from the projection apparatus.

In the embodiment in FIG. 4, the part of the illumination beam 214c reflected by the filtering unit 226 includes an ultraviolet beam. Therefore, when the part of the illumination beam 214c irradiates to the wavelength conversion unit 260c, the converted beam 216c in the third color (blue) can be excited. The blue converted beam 216c then passes through the blue filtering unit 226 to reach the light valve 110 (as shown in FIG. 1A). Accordingly, the embodiment in FIG. 4 can enhance the intensity of the blue part in the light provided by the illumination system 200.

Figure 5:
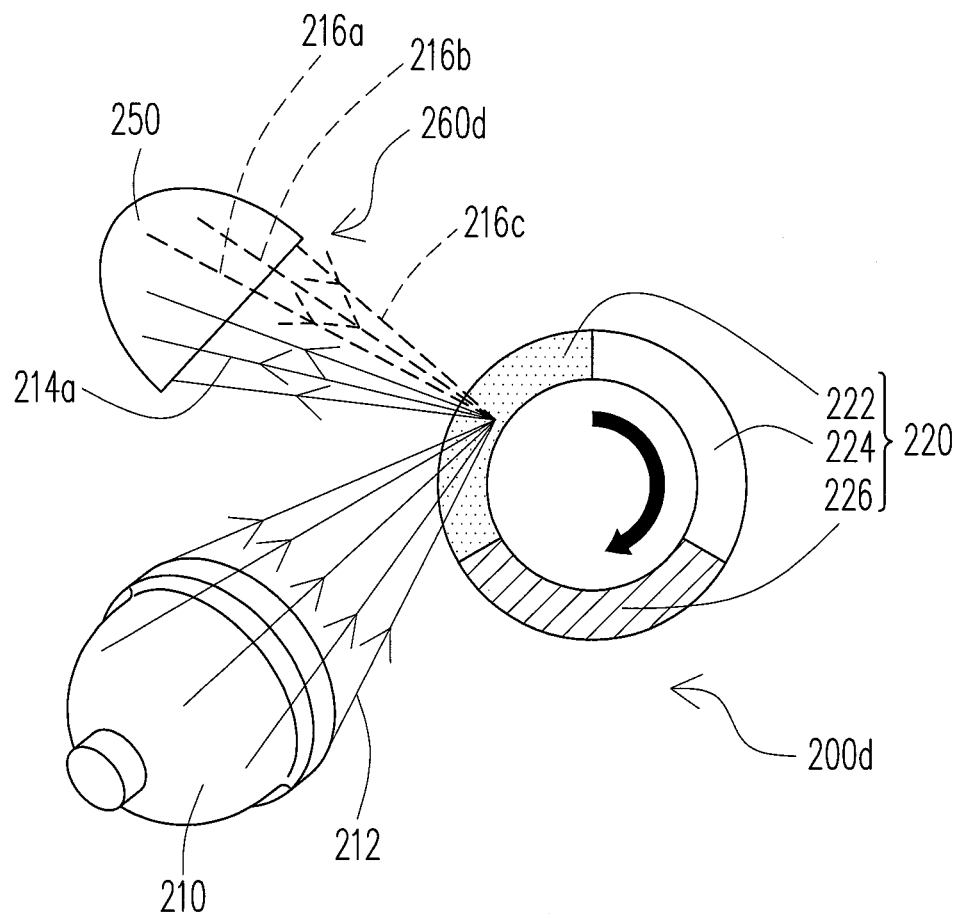
FIG. 5 is a schematic diagram illustrating an illumination system according to another embodiment of the invention.

FIG. 5 is a schematic diagram illustrating an illumination system according to another embodiment of the invention. Referring to FIG. 5, an illumination system 200d in the present embodiment is similar to the illumination system 200 in FIG. 1A. The differences of the two are illustrated below. In the illumination system 200d of the present embodiment, a wavelength conversion unit 260d includes a phosphor in the first color (i.e. red), a phosphor in the second color (i.e. green), and a phosphor in the third color (i.e. blue). When the filtering unit 222 of the filtering module 220 moves into the transmission path of the illumination beam 212, the part of the illumination beam 214a reflected by the filtering unit 222 includes the beam in the second color (green), the beam in the third color (blue), and the beam in the fourth color (ultraviolet). These beams excite the phosphor in the first color (red), so that the phosphor in the first color emits the converted beam 216a in the first color and the converted beam 216a in the first color passes through the filtering unit 222 in the first color to reach the light valve 110. When the filtering unit 224 of the filtering module 220 moves into the transmission path of the illumination beam 212, the part of the illumination beam reflected by the filtering unit 222 includes the beam in the third color (blue) and the beam in the fourth color (ultraviolet). These beams excite the phosphor in the second color (green), so that the phosphor in the second color emits the converted beam 216b in the second color and the converted beam 216b in the second color passes through the filtering unit 224 in the second color to reach the light valve 110. Moreover, when the filtering unit 226 of the filtering module 220 moves into the transmission path of the illumination beam 212, the part of the illumination beam reflected by the filtering unit 226 includes the beam in the fourth color (ultraviolet). The fourth beam excites the phosphor in the third color (blue), so that the phosphor in the third color emits the converted beam 216c in the third color and the converted beam 216c in the third color passes through the filtering unit 226 in the third color to reach the light valve 110.

Hence, the illumination system 200d in the present embodiment can recycle and re-utilize the light reflected by the filtering unit 222, 224, and 226 in each color, thereby further enhancing the light efficiency of the illumination system 200d and the projection apparatus.

Figure 6B:
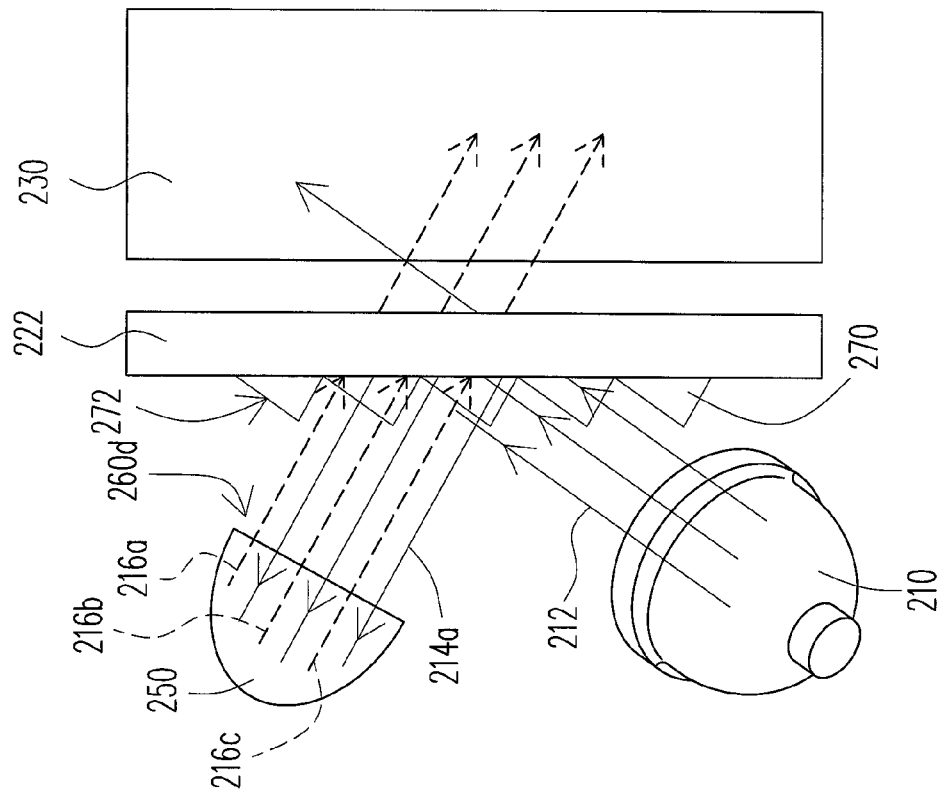
FIG. 6B shows a side view diagram of a plurality of filtering units, a multi-layer optical coating layer, and a light uniformization device in the illumination system in FIG. 6A.
Figure 6A:
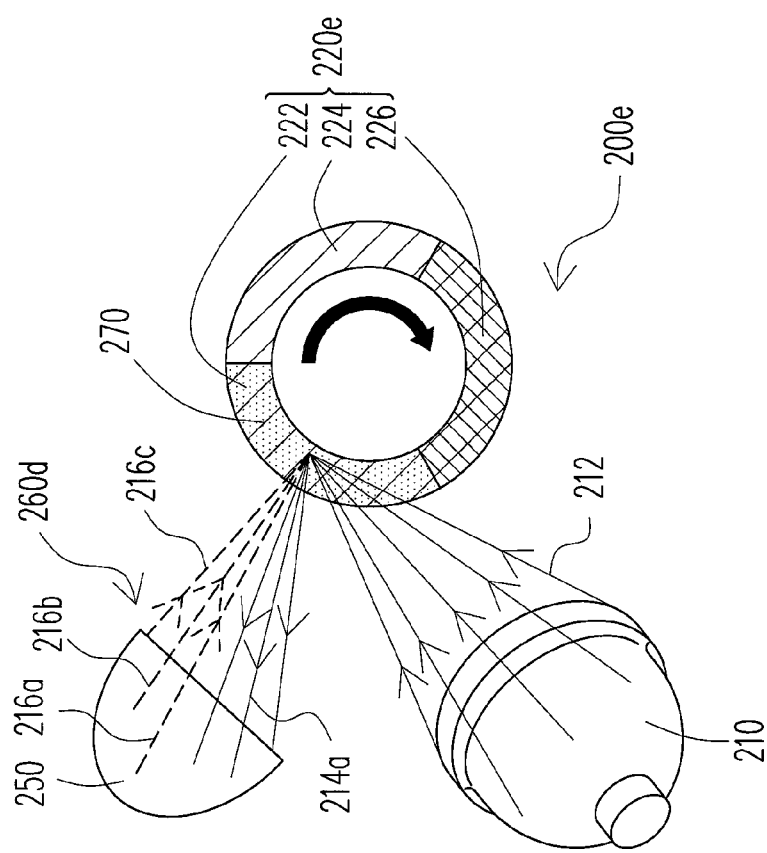
FIG. 6A is a schematic diagram illustrating an illumination system according to another embodiment of the invention.

FIG. 6A is a schematic diagram of an illumination system according to another embodiment in the invention. FIG. 6B shows a side view diagram of a plurality of filtering units, a multi-layer optical coating layer, and a light uniformization device in the illumination system in FIG. 6A. Referring to FIGS. 6A and 6B, an illumination system 200e in the present embodiment is similar to the illumination system 200d in FIG. 5. The differences of the two are illustrated below. In the illumination system 200e of the present embodiment, a filtering module 220e further includes a multi-layer optical coating layer 270 which is disposed on the filtering units 222, 224, and 226 and located between the wavelength conversion unit 260d and the filtering units 222, 224, and 226. Consequently, a part of the converted beams 216a, 216b, 216c from the wavelength conversion unit 260d and the part of the illumination beam 212 reflected by the filtering units and not converted by the wavelength conversion unit 260d are reflected back to the wavelength conversion unit 260d. Specifically, when the filtering unit 226 moves into the transmission path of the illumination beam 212, the part of the illumination beam 212 is reflected to the wavelength conversion unit 260d. At this time, the part of the illumination beam 212 includes the beam in the fourth color (i.e. the ultraviolet beam). The beam in the fourth color (the ultraviolet beam) excites the phosphor in the third color (blue) in the wavelength conversion unit 260d, such that the phosphor in the third color emits the converted beam 216c in blue to transmit the blue converted beam 216c to the filtering unit 226. In addition, the beam in the fourth color not yet converted by the phosphor in the third color is reflected to the filtering unit 226 by the filtering unit 250 and then reflected back to the wavelength conversion unit 260d by the multi-layer optical coating layer 270. As a consequence, the beam in the fourth color which is not converted has the chance to excite the phosphor in the third color next time to achieve re-utilization. Furthermore, when the part of the beam in the fourth color that is transmitted to the wavelength conversion unit 260d for the second time is not yet converted by the wavelength conversion unit 260d, the part of the beam in the fourth color can still be reflected back to the wavelength conversion unit 260d by the multi-layer optical coating layer 270 to achieve the next conversion. This method of exciting the wavelength conversion unit 260d with light over and over again is referred as a recursive emission. The beams in different colors and not converted by the wavelength conversion unit in the following can all be reflected by the multi-layer optical coating layer 270 repetitively to achieve the recursive emission. Therefore, a one-time conversion is used as an example for illustration below to omit the repetitive conversions.

When the filtering unit 224 moves into the transmission path of the illumination beam 212, the part of the illumination beam 212 is reflected to the wavelength conversion unit 260d. At this time, the part of the illumination beam 212 includes the beam in the fourth color (i.e. the ultraviolet beam) and the beam in the third color (i.e. the blue beam). The beam in the fourth color (the ultraviolet beam) excites the phosphor in the third color (blue) and the phosphor in the second color (green) in the wavelength conversion unit 260d. Moreover, the beam in the third color (blue) excites the phosphor in the second color (green), so that the phosphor in the third color and the phosphor in the second color emit the converted beam 216c in the third color (blue) and the converted beam 216b in the second color (green) respectively for transmitting to the filtering unit 226. The converted beam 216b passes through the filtering unit 224. The converted beam 216c is reflected back to the wavelength conversion unit 260d by the multi-layer optical coating layer 270 and excites the phosphor in the second color for the phosphor in the second color to emit the beam in the second color. The beam in the second color is reflected to the filtering unit 224 by the reflection unit 250 and passes through the filtering unit 224.

When the filtering unit 222 moves into the transmission path of the illumination beam 212, the part of the illumination beam 212 is reflected to the wavelength conversion unit 260d. At this time, the part of the illumination beam 212 includes the beam in the fourth color (i.e. the ultraviolet beam), the beam in the third color (i.e. the blue beam), and the beam in the second color (i.e. the green beam). The beam in the fourth color (the ultraviolet beam) excites the phosphor in the third color (blue), the phosphor in the second color (green), and the phosphor in the first color (red) in the wavelength conversion unit 260d. The beam in the third color (i.e. the blue beam) excites the phosphor in the second color (green) and the phosphor in the first color (red) in the wavelength conversion unit 260d. The beam in the second color (i.e. the green beam) excites the phosphor in the first color (red) in the wavelength conversion unit 260d for the phosphor in the third color, the phosphor in the second color, and the phosphor in the first color to emit the converted beam 216c in the third color (blue), the converted beam 216b in the second color (green), and the converted beam 216a in the first color (red) for transmitting to the filtering unit 222. The converted beam 216a passes through the filtering unit 224. The converted beams 216b and 216c are reflected back to the wavelength conversion unit 260d by the multi-layer optical coating layer 270. The converted beam 216c (the blue beam) reflected back to the wavelength conversion unit 260d excites the phosphor in the second color (green) and the phosphor in the first color (red). The converted beam (the green beam) reflected back to the wavelength conversion unit 260d excites the phosphor in the first color (red), so that the phosphor in the second color and the phosphor in the first color emit the beam in the second color and the beam in the first color respectively. The beam in the first color passes through the filtering unit 222 for transmitting to the light valve 110. The beam in the second color is reflected back to the wavelength conversion unit 260d by the multi-layer optical coating layer 270. The beam in the second color which is reflected back to the wavelength conversion unit 260d then excites the phosphor in the first color, such that the phosphor in the first color emits the beam in the first color. The beam in the first color passes through the filtering unit 222 for transmitting to the light valve 110.

Using the recursive emission method for repetitive emission, the illumination beam 212 emitted by the light source 210 can be utilized to its full extent so as to further enhance the light efficiency of the illumination system 200e and the projection apparatus.

The multi-layer optical coating layer 270 includes a prism array layer. The prism array layer has a surface 272 facing the wavelength conversion unit 260d, such that the part of the converted beam from the wavelength conversion unit 260d and the part of the illumination beam 212 not converted by the wavelength conversion unit 260d are reflected to the wavelength conversion unit 260d. In one embodiment, the multi-layer optical coating layer 270 further includes a dichroic layer.

Figure 7:
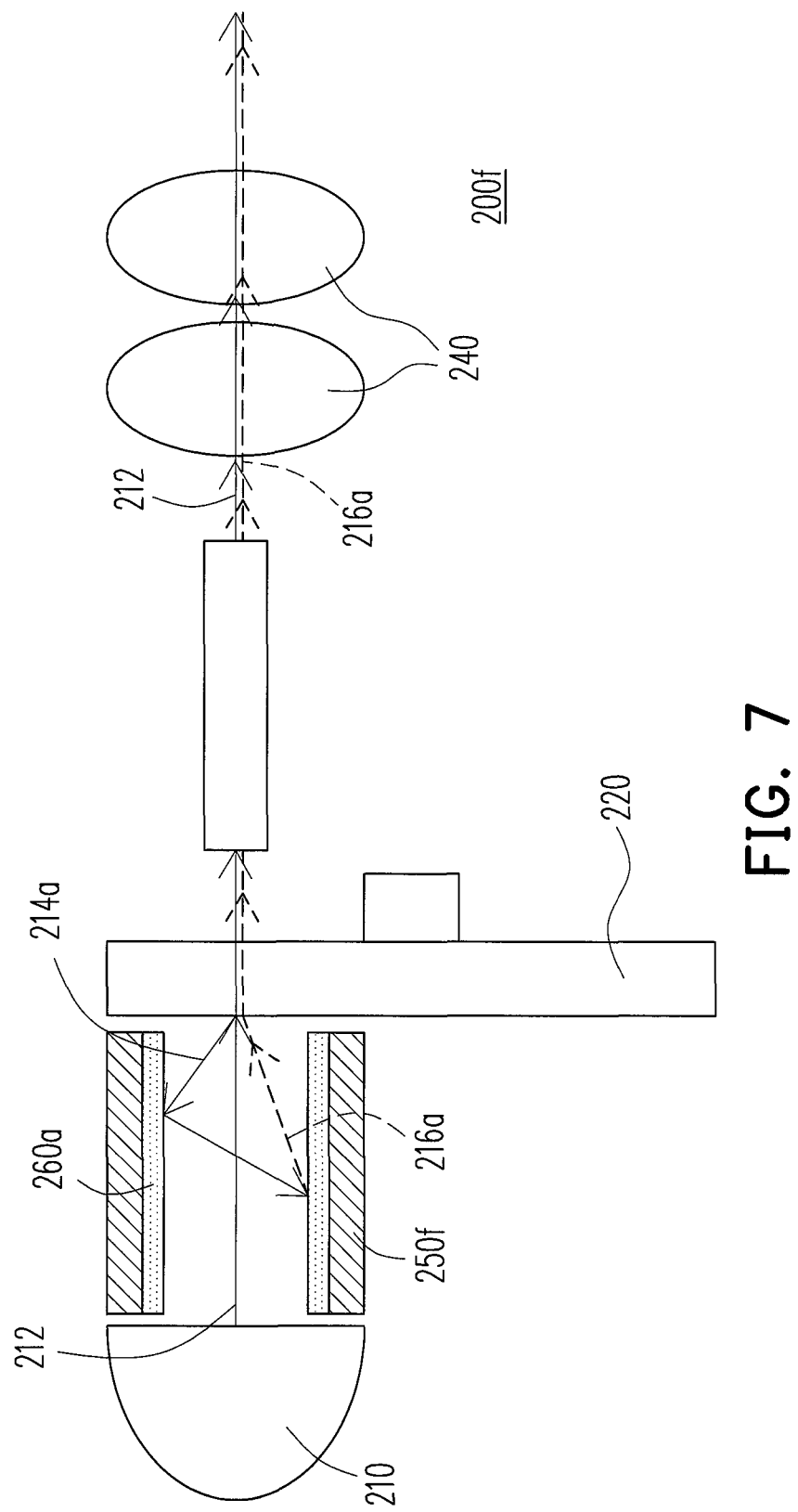
FIG. 7 is a schematic diagram illustrating an illumination system according to another embodiment of the invention.

FIG. 7 is a schematic diagram illustrating an illumination system according to another embodiment of the invention. An illumination system 200f in the present embodiment is similar to the illumination system 200 in FIG. 1A. The differences of the two are illustrated below. In the illumination system 200f of the present embodiment, a reflection unit 250f is a reflection sleeve disposed between the light source 210 and the filtering module 220. Here, the illumination beam 212 is transmitted in the reflection sleeve. In addition, the wavelength conversion unit 260a is disposed on an inner wall of the reflection sleeve. In the present embodiment, the reflection sleeve is disposed surrounding the optical axis of the light source 210. Consequently, the part of the illumination beam 214a reflected by the wavelength conversion unit 220 can be converted to the converted beam 216a so as to recycle and re-utilize the light.

In the present embodiment, the wavelength conversion unit 260a is adopted as an example. In other embodiments, the wavelength conversion units 260b, 260c, and 260d, or other suitable wavelength conversion units can be applied to replace the wavelength conversion unit 260a in the present embodiment.

In summary, since the illumination system and the projection apparatus in the embodiments of the invention adopt the wavelength conversion unit to convert the light reflected by the filtering units and apply the reflection unit to reflect the converted beam converted by the filtering units back to the filtering units, the illumination system and the projection apparatus in the embodiments of the invention are capable of recycling and re-utilizing the light that failed to pass through the filtering module. Consequently, the illumination system and the projection apparatus have high light efficiency.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:
1. An illumination system, comprising:
a light source configured to emit an illumination beam;
a filtering module disposed on a transmission path of the illumination beam and comprising a plurality of filtering units of different colors, the filtering units moving into the transmission path of the illumination path in turn, wherein each of the filtering units reflects a part of the illumination beam and allows another part of the illumination beam to pass through;
a wavelength conversion unit disposed on a transmission path of the part of the illumination beam reflected by at least one of the filtering units to convert the part of the illumination beam reflected by the at least one of the filtering units into a converted beam; and a reflection unit, wherein the wavelength conversion unit is disposed on the reflection unit, the reflection unit reflects the converted beam to the at least one of the filtering units, and at least a part of the converted beam passes through the at least one of the filtering units.

2. The illumination system as claimed in claim 1, wherein the wavelength conversion unit is a fluorescent layer.

3. The illumination system as claimed in claim 2, wherein the fluorescent layer comprises a phosphor in a single color.

4. The illumination system as claimed in claim 2, wherein the fluorescent layer comprises a phosphor in a first color, a phosphor in a second color, and a third phosphor in a third color, and a color of the filtering units comprises the first color, the second color, and the third color.

5. The illumination system as claimed in claim 4, wherein the filtering module further comprises a multi-layer optical coating layer disposed on the filtering units and between the wavelength conversion unit and the filtering units for a part of the converted beam from the wavelength conversion unit and the part of the illumination beam reflected by the filtering unit and not converted by the wavelength conversion unit to reflect back to the wavelength conversion unit.

6. The illumination system as claimed in claim 1, wherein the filtering module is a color wheel.

7. The illumination system as claimed in claim 1, wherein the reflection unit is a concave mirror to converge the converted beam on the at least one of the filtering units.

8. The illumination system as claimed in claim 1, wherein the reflection unit is a reflection sleeve disposed between the light source and the filtering module, and the illumination beam is transmitted in the reflection sleeve.

9. The illumination system as claimed in claim 1, wherein an optical axis of the light source tilts relative to the filtering units and an optical axis of the reflection unit tilts relative to the filtering units.

10. A projection apparatus, comprising:
an illumination system, comprising:
a light source configured to emit an illumination beam;
a filtering module disposed on a transmission path of the illumination beam and comprising a plurality of filtering units of different colors, the filtering units moving into the transmission path of the illumination path in turn, wherein each of the filtering units reflects a part of the illumination beam and allows another part of the illumination beam to pass through;
a wavelength conversion unit disposed on a transmission path of the part of the illumination beam reflected by at least one of the filtering units to convert the part of the illumination beam reflected by the at least one of the filtering units into a converted beam; and
a reflection unit, wherein the wavelength conversion unit is disposed on the reflection unit, the reflection unit reflects the converted beam to the at least one of the filtering units, and at least a part of the converted beam passes through the at least one of the filtering units;
a light valve disposed on a transmission path of the another part of the illumination beam passing through the at least one of the filtering units and the at least a part of the converted beam to convert the another part of the illumination beam passing through the at least one of the filtering units and the at least a part of the converted beam into an image beam; and
a projection lens disposed on a transmission path of the image beam.

11. The projection apparatus as claimed in claim 10, wherein the wavelength conversion unit is a fluorescent layer.

12. The projection apparatus as claimed in claim 11, wherein the fluorescent layer comprises a phosphor in a single color.

13. The projection apparatus as claimed in claim 11, wherein the fluorescent layer comprises a phosphor in a first color, a phosphor in a second color, and a third phosphor in a third color, and a color of the filtering units comprises the first color, the second color, and the third color.

14. The projection apparatus as claimed in claim 13, wherein the filtering module further comprises a multi-layer optical coating layer disposed on the filtering units and between the wavelength conversion unit and the filtering units for a part of the converted beam from the wavelength conversion unit and the part of the illumination beam reflected by the filtering unit and not converted by the wavelength conversion unit to reflect back to the wavelength conversion unit.

15. The projection apparatus as claimed in claim 10, wherein the filtering module is a color wheel.

16. The projection apparatus as claimed in claim 10, wherein the reflection unit is a concave mirror to converge the converted beam on the filtering units.

17. The projection apparatus as claimed in claim 10, wherein the reflection unit is a reflection sleeve disposed between the light source and the filtering module, and the illumination beam is transmitted in the reflection sleeve.

18. The projection apparatus as claimed in claim 10, wherein an optical axis of the light source tilts relative to the filtering units and an optical axis of the reflection unit tilts relative to the filtering units.

* * * * *